Aug. 19, 1941.                D. R. STEWART                2,252,993
                    MATERIAL CUTTING AND TESTING MACHINE
                        Filed Nov. 23, 1938        5 Sheets-Sheet 3
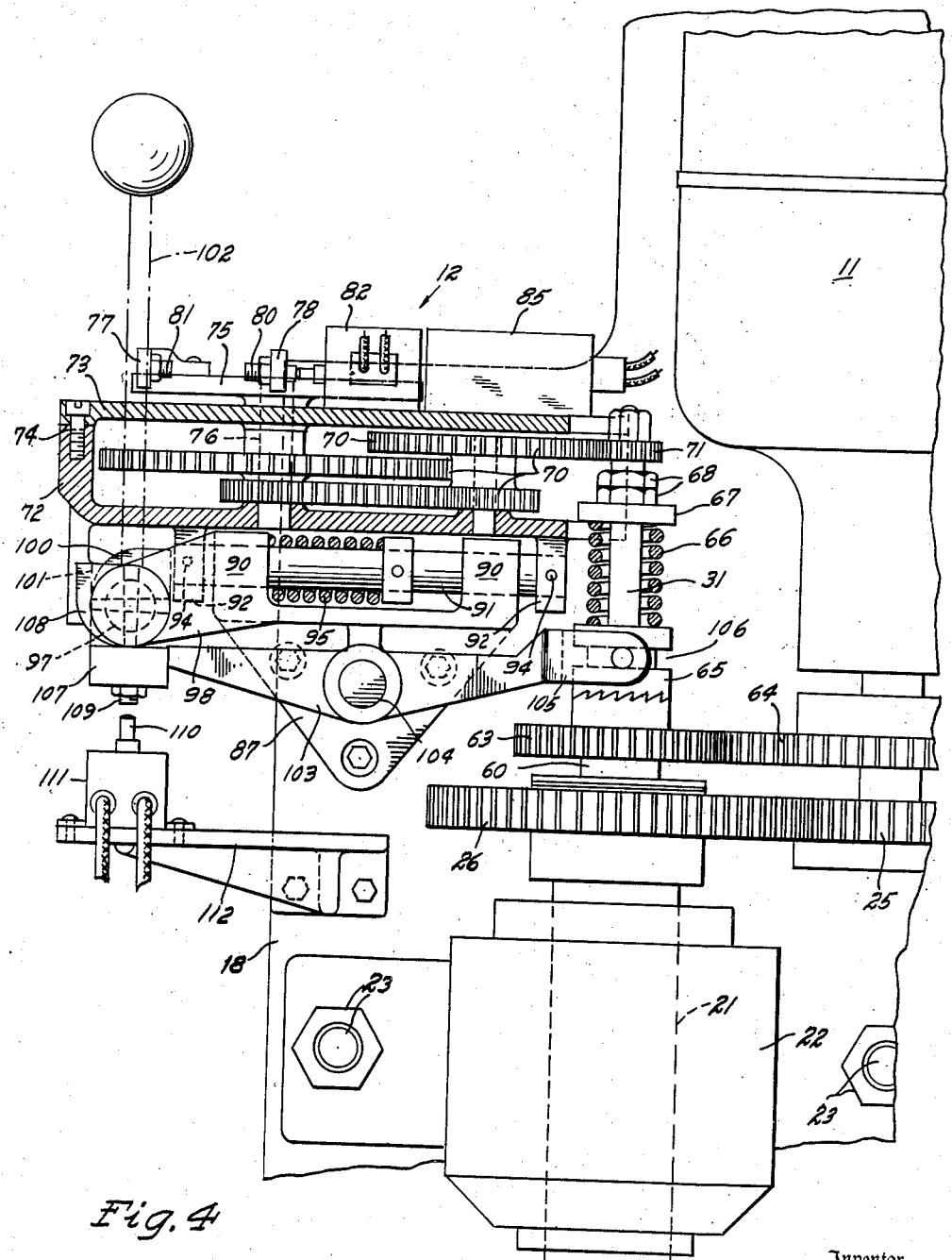
Fig. 4
Inventor
DONALD R. STEWART.
By 
Attorneys

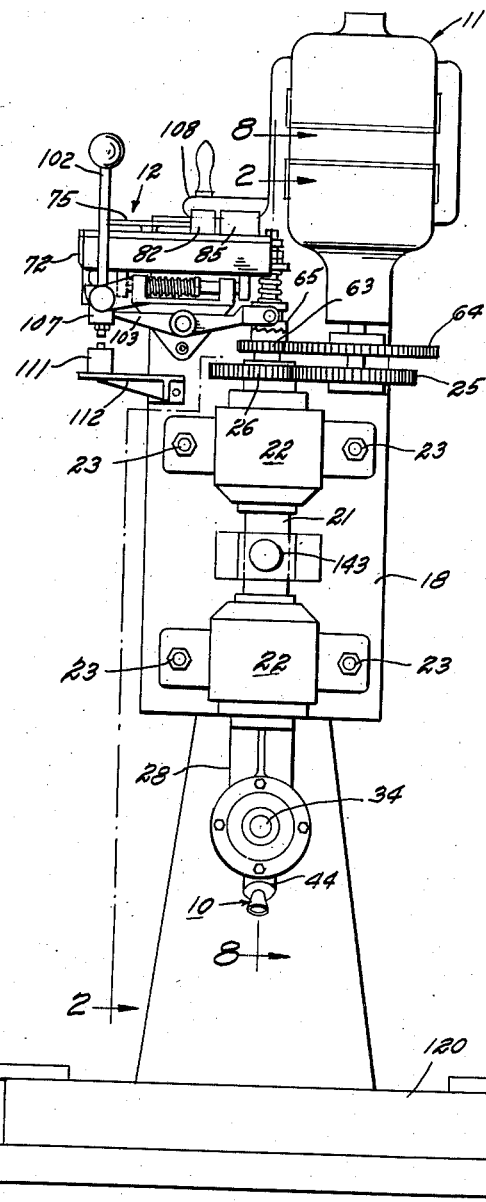

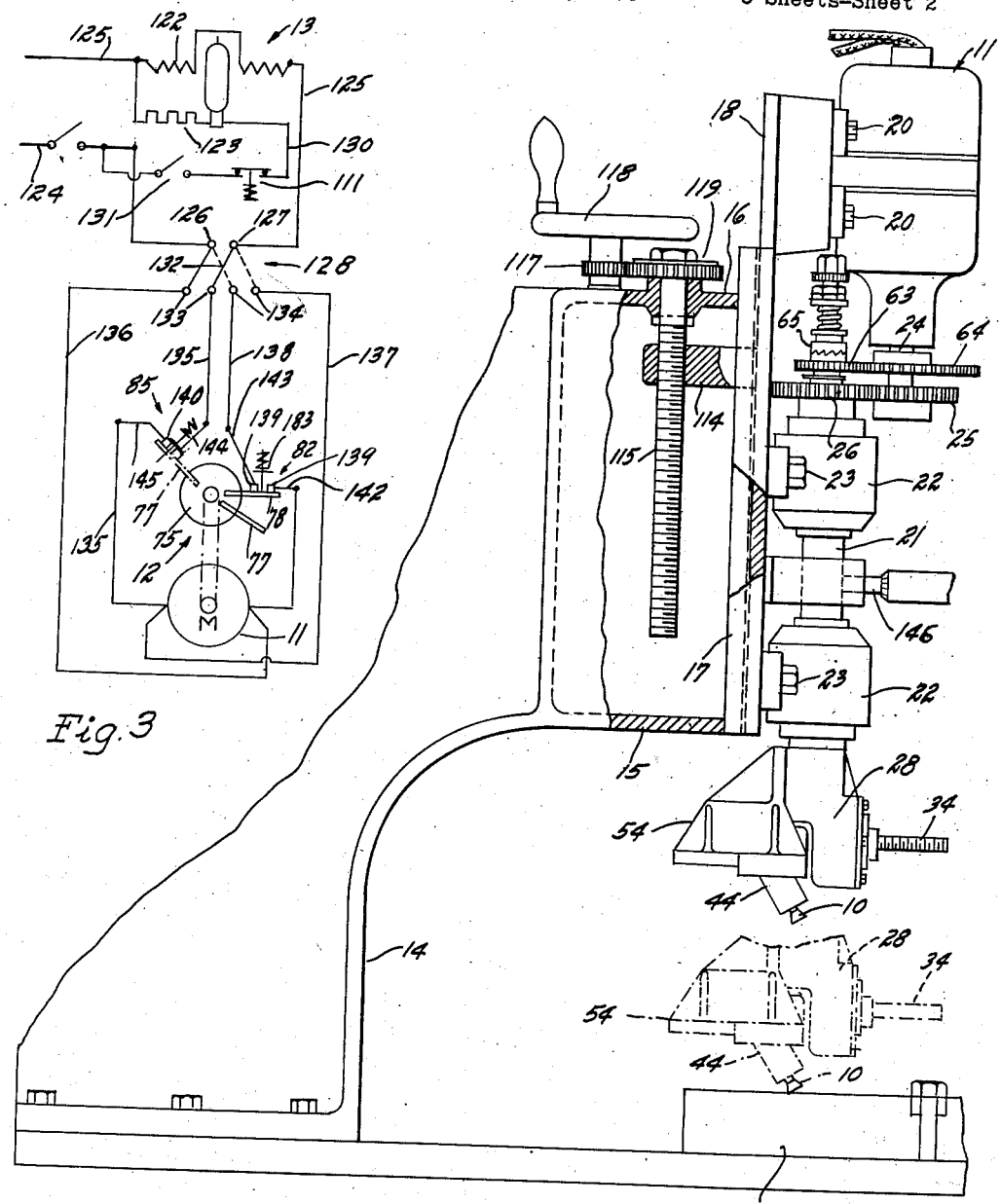

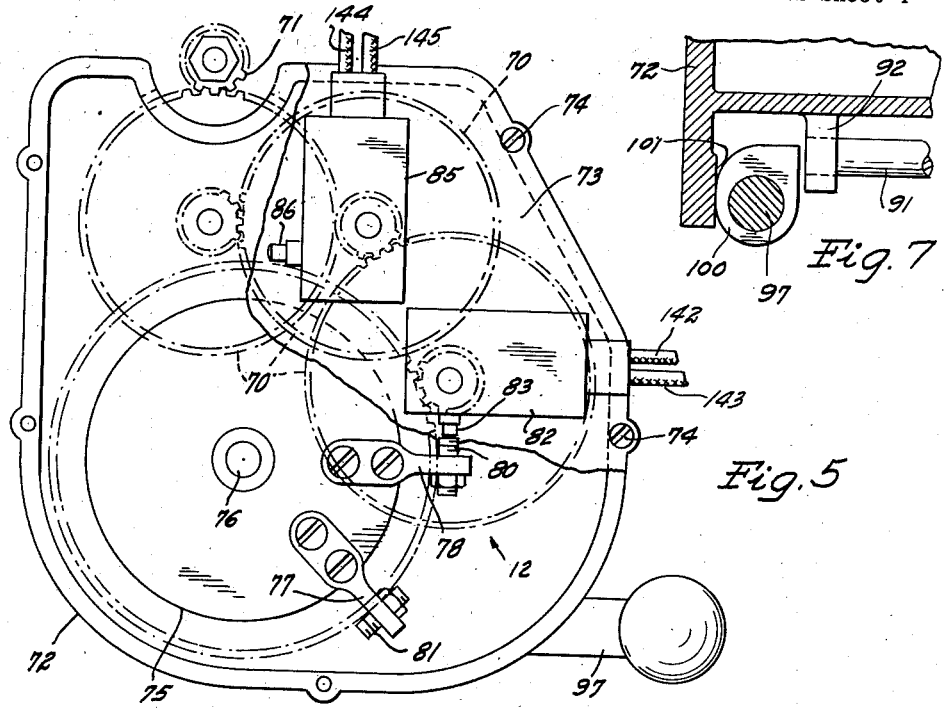
Fig. 7
Fig. 5
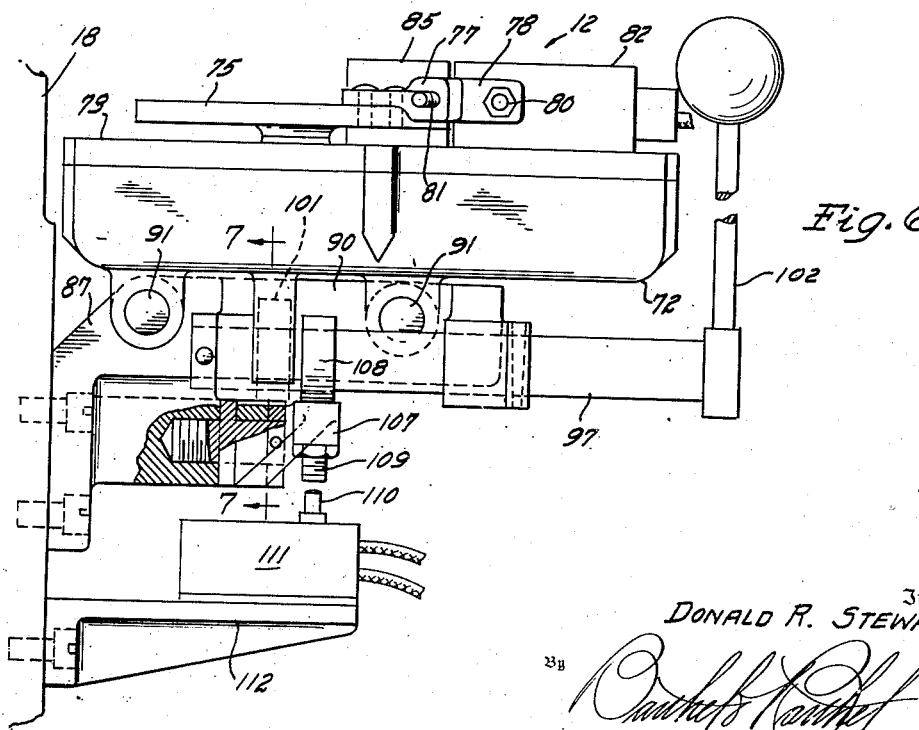
Fig. 6

Patented Aug. 19, 1941

2,252,993

UNITED STATES PATENT OFFICE 2,252,993

MATERIAL CUTTING AND TESTING MACHINE

Donald R. Stewart, Detroit, Mich.

Application November 23, 1938, Serial No. 242,038

12 Claims. (Cl. 265—12)

This invention relates generally to a machine for cutting material and testing the characteristics thereof and more particularly to a machine for testing the bond of abrasive articles.

It is an object of the present invention to provide a new and novel machine for testing the characteristics of material by removing or cutting away some of the material with a tool and to provide a machine of this character in which recording of the characteristics of the material will not materially vary with wear of the tool over a reasonable time period.

Another object of the invention is to provide a machine which will accurately record the characteristics of material by recording the energy necessary to operate a material removing or cutting tool over a predetermined operation of the tool.

Another object of the invention is to provide a machine for testing, among other characteristics, the machinability of material by recording the electrical energy employed by an electrically operated tool and to provide a machine of this character in which the reading of the energy employed will not be affected by the usual fluctuations in line voltage.

Another object of the invention is to provide a new and novel machine for testing the bond of an abrasive article, such as a grinding wheel.

A further object of the invention is to provide a new and improved cutting tool and operating mechanism therefor.

Other objects of the invention will become apparent from the following description taken in connection with the accompanying drawings in which—

Figure 1 is a view in elevation of my machine;

Fig. 2 is a view of the machine taken substantially along the line and in the direction of the arrows 2—2 of Fig. 1 and having parts removed and broken away to show certain details of construction;

Fig. 3 is a diagrammatical view of the electric circuit of the machine;

Fig. 4 is an enlarged fragmentary view of the machine showing in detail the mechanism which was removed from the view, Fig. 2;

Fig. 5 is a top plan view of part of the machine;

Fig. 6 is an elevational view of the part of the machine shown in Fig. 5, and having parts broken away and in section;

Fig. 7 is a view showing certain details of the machine and taken along the line 7—7 of Fig. 6.

Figure 8:
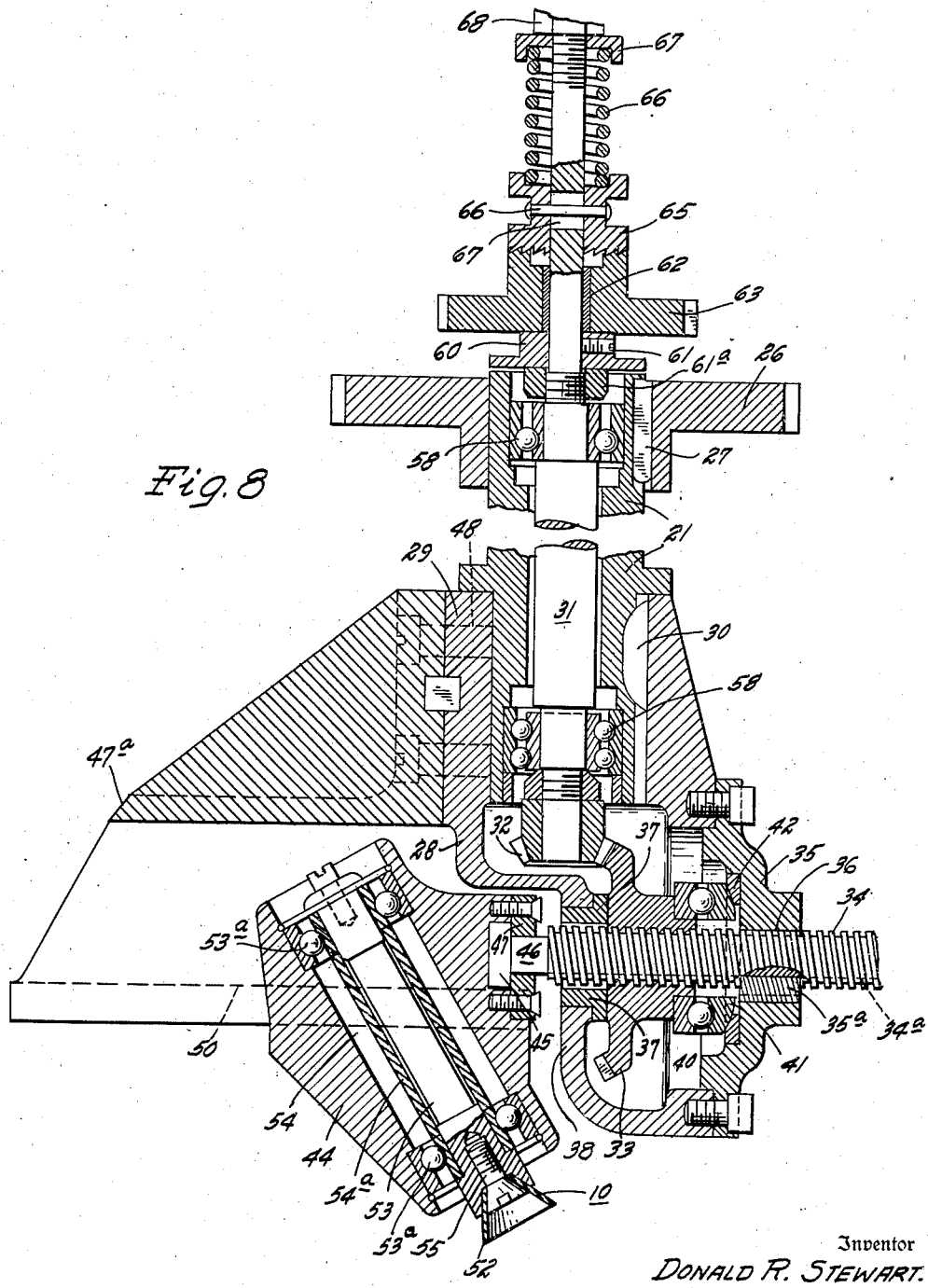
Fig. 8 is a view in vertical section of the machine taken substantially along the line 8—8 of Fig. 1.

Referring to the drawings by characters of reference, the machine shown comprises in general, a driven tool 10, a driving power means 11, control mechanism 12, and an energy recorder 13, Fig. 3. In the present instance, the power means 11 is an electric motor and the recorder, a standard rotating watt hour meter, is adapted to record the energy employed by the motor 11 in driving the tool for a predetermined operation controlled by the mechanism 12. Thus, with the tool 10 acting on material frictionally such as, removing or cutting away some of the material, the load on the motor or electric energy employed thereby is recorded to give a corresponding indication of characteristics of the material, such as, its machinability, the character of the bond of an abrasive article, etc.

The machine includes a base or standard 14 which is preferably provided with a horizontally extended or overhanging upper end portion 15 which may be hollow and formed in part by a top wall 16. The upper end 15 of the base is provided with extended, vertical guides 17 cooperable with guideways of a vertically, adjustably movable supporting member or plate 18 which carries the tool 10, motor 11, and the interconnecting mechanism therefor which is hereinafter described in detail. The motor 11 is of the reversible type and may be rigidly secured to the vertically movable supporting plate 18 by bolts 20 or by any other suitable means. The motor 11 is adapted to drive or rotate a supporting structure for the tool 10, the supporting structure including a spindle or open ended tube 21 which is arranged to rotate about a substantially vertical axis and is journaled in vertically spaced bearing containers 22 which may be rigidly secured to the supporting plate 18 by screws and nuts 23 or by other suitable means.

The motor 11 is adapted to rotate the spindle 21 and to this end is provided with a depending drive shaft 24 having keyed or otherwise secured thereon, a drive gear 25 which meshes with and drives a gear 26 which is keyed, as at 27, to and adjacent the upper end of the spindle 21, Fig. 8. A supporting member or casing 28 is provided with an upwardly directed tubular portion 29 which receives a lower end portion of the spindle 21, the casing 28 being keyed, as at 30, or otherwise secured to the spindle to rotate therewith. Within the spindle 21 is a rotatable shaft 31 which is coaxial with the spindle and secured to the lower end of the shaft 31 to rotate therewith, a drive gear 32, within the casing 28, meshes with and rotates a bevel gear 33 which is internally threaded to receive an elongated worm gear or lead screw 34 having its axis of rotation transverse to the common axis of the shaft and spindle. Overlying the gear 33, the casing 28 is provided with an opening closable by a removable closure member or cover plate 35 which is preferably provided with an opening or bore 36 for rotatably receiving the worm gear 34 to give added bearing support thereto. Similarly, a tubular insert or bearing member 37 is provided in the casing wall 38, spaced from plate 35, to receive and give further bearing support to the worm gear 34. Preferably, the lead screw 34 is provided longitudinally thereof with a keyway 34a and the cover plate 35 is provided with a key 35a cooperable with the keyway to prevent turning or rotating of the screw 34 so that rotation of gear 33 will cause the screw to move rectilinearly in the direction of its longitudinal axis. In the casing tubular portion 29, a thrust roller bearing unit has one race 40 thereof secured to a reduced extended portion or hub of the gear 33, the other race, as at 41, having a convex bearing surface abutting a concave bearing surface of a ring-like abutment member 42 which is secured to the cover plate 35 in an inner recess thereof.

The tool 10 is carried by a body or casing 44 which is attached to one end of the worm gear 34 for movement thereby transversely to the axis of the shaft 31. To this end, the tool carrying body 44 may be provided with a bored recess to receive an enlarged cylindrical end portion or thrust bearing 45 provided on the end of a shaft portion 46 of the worm gear or lead screw 34. A retainer plate 47 having a bore to receive the shaft portion 46 may be provided and may be rigidly secured to the body 44 by screws, or by other suitable means. A casting 47a is rigidly secured to the gear housing or casing 28, such as by screws 48, which screwthread through the casing side wall and abut the spindle outer wall surface to secure the casting, casing and spindle together. The tool body 44 is slidably supported on the casting 47a which is provided with guideways 50 to receive complementary guides on the body 44.

In order to provide a tool which will not wear quickly, I provide a hollow, frustro-conical tool, previously designated by the numeral 10, having an outer circular pushing or shearing or cutting edge 52. The term "pushing" edge is employed, since when the machine is employed to test the bond of an abrasive or grinding wheel the tool has a combination cutting and pushing action. A freely rotatable shaft 53, is journaled in ball bearings 53a positioned in a relatively large opening 54 in the body 44 and these bearings may be spaced by a tubular spacer member 54a. The shaft 53 is provided in the lower end thereof with a conical recess to receive the converging end portion of the tool 10 which may be rigidly secured to the shaft by a screw 55, preferably having a complementary tapered head to seat in the hollow frustro-conical tool. The axis of rotation of the cutter is arranged at an acute angle to the axis of the spindle 21 so that the cutting edge 52 of the tool is directed downwardly and so that the tool will rotate or roll on material to be cut or tested.

The shaft 31 extends out of the upper end of the spindle 21 and surrounding the shaft above the spindle, a spacer abutment member 60 is secured to the shaft by a set screw 61, the spacer member seating on a bearing lock or retaining nut 61a. The spacer member 60 also provides a seat for a gear 63 having a bushing 62, the gear 63 being in mesh with and driven by a gear 64 secured on the drive shaft 24 of the electric motor 11. On the upper end of the gear 63, clutch teeth are provided for clutching action with complementary teeth provided on the lower end of a vertically movable clutch member 65. The clutch member 65 is secured to the shaft 31 against rotation by a pin 66, the shaft having an elongated aperture 67 to receive the pin and permit vertical movement of the clutch member 65 on or relative to the shaft. Thus, it will be seen that with the clutch member 65 in position, coupling the gear 63 to the shaft 31, operation of the motor 11 rotates the shaft 31 and through gears 32, 33 and worm gear 34 moves the tool 10 outwardly from the axis of the shaft 31. Also, the motor 11 rotates the spindle 21 which results in the tool 10 being revolved bodily about the common vertical axis of the shaft 31 and spindle 21. The shaft 31 and the spindle 21 rotate in the same direction, but gears 63, 64 and gears 25, 26 are selected such that the spindle rotates faster than the shaft, and gears 32, 33 and 34 are selected whereby the tool revolves bodily at a greater rate than it is moved outwardly by the worm gear 34. As a result of the above mentioned speed differentials, the tool 10, offset from the axis of the spindle 21 is rotated by and upon rotation of the spindle and bodily travels or revolves spirally. A helical coil spring 66 surrounds the shaft 31, under compression, and urges the clutch member 65 downwardly into coupling relation with the clutch teeth of the gear 63. The lower end of the spring 66 seats on the upper surface of the clutch member 65 and the upper end of the spring abuts a spring retainer 67 which is apertured to receive the shaft 31 and is limited in its upward movement relative thereto by lock nuts 68 screwthreaded onto the shaft. Preferably, the cooperating clutch teeth are angularly disposed, as shown, to provide for relative rotation or slipping between the clutch parts. Slipping between the clutch parts occurs or may occur when on return of the tool 10 to its starting position the tool body 44 engages the gear casing 28 as a stop. This clutch slipping action permits continued operation of the spindle without injury to the machine.

The control device 12 which, under normal conditions, is a time control for the motor 11, is operated by the motor through a train of speed reduction gears, designated in general by the numeral 70, the gears 70 being driven by a gear 71 mounted on and secured to the motor driven shaft 31. Preferably, the speed reduction gears 70 are enclosed in a housing 72 having a removable top wall or cover 73 which may be rigidly secured in place by screws 74, or by other suitable means. Mounted on the cover 73, externally of the casing 72, the control mechanism preferably includes a rotatable control member which may be a disc, and this disc is secured to a vertical shaft 76 which is the driven speed reduced or take off shaft from the speed reduction gear train 70. Carried by and rigidly secured to the disc 75, a pair of radially spaced arms 77, 78 carry contact members 80, 81 respectively which may be adjustable relative to their respective supporting arms and to this end may be screws, as shown. Mounted on the cover 73 externally thereof, a switch, designated in general by the numeral 82 is provided with a movable contact member 83 arranged to be engaged and actuated by the contact 80. Similarly, a switch 85 is provided with a movable contact or switch mechanism actuator 86 engageable and operable by the contact member 81. Switches 82 and 85 are normally closed switches, which may be of any of the well known types and are therefore not shown nor described in detail.

Rigidly secured to the vertically movable supporting plate 18 immediately below the housing 72, a support or bracket 87 is provided with a pair of spaced, upwardly directed side flanges 90 having aligned apertures or bores for receiving a pair of spaced, parallel supports or shafts 91. The shafts 91 are arranged for endwise sliding or longitudinal movement in their supporting bores, transversely to the axis of rotation of shaft 31, and these shafts carry the housing 72. Integral with and depending from the bottom wall of the housing 72, pairs of spaced bosses or lugs 92 are provided having aligning apertures to receive outer end portions of the shafts 91 to which the bosses 92 may be secured by pins 94 or by other suitable means. The casing 72, speed reduction gears 70 and control mechanism 12 are urged as a unitary structure toward the drive shaft 31 by means, such as helical coil springs 95, only one of which is shown, for yieldably holding the gear train 70 in driving relation with motor driven gear 71.

A shaft 97 is supported for rotation in aligning bores provided in a pair of spaced arms 98 which are integral with the bracket 87, and secured to the shaft 97, a cam 100 is arranged to engage a depending wall 101 of the housing 72 to move the housing to disengage the gear train 70 from the drive gear 71. On or adjacent one end of the shaft 97, a lever 102 may be provided for rotating the shaft. A lever 103, pivoted intermediate its ends, as at 104 to the bracket 87 has one end 105 forked to engage in an annular recess 106 provided in the clutch member 65 and the other end 107 of the lever 103 positions immediately beneath a cam 108 which is secured on and to the manually operable shaft 97 to pivot the lever to disengage the clutch. Carried by the lever end 107, an adjustable contact 109 is adapted to engage a movable contact or actuator 110 of a switch 111 which is disposed beneath the lever end 107 and is mounted on a bracket 112 which in turn is mounted on the vertically slidable plate 18. The switch 111 is a normally closed switch which may be of any suitable type.

The supporting plate 18 which carries the tool 10, motor 11, control mechanism 12, and the mechanism which operatively connects the tool and motor is provided with an integral lug or boss 114 having a threaded aperture to receive a threaded screw 115 which is rotatably supported in a bore in the top wall of the hollow upper end 15 of the standard 14. Keyed or otherwise secured to the upper end of the screw 115, a gear 116 meshes with a gear 117 provided on a shaft which may be manually rotated by a hand wheel 118. By means of the hand wheel 118, it will be seen that the entire mechanism carried by the vertically movable plate 18 may be raised or lowered with respect to the work or material as at 120 upon which the tool is to act. The tool is lowered and forced into the material to a desired depth, and to ascertain the desired depth of penetration an indicator or dial plate 119 operated on rotation of the screw may be provided and retained by and under the head of the screw.

In order that a number of the herein described machines may give substantially the same reading for a given piece of material tested, I provide a brake 146 for each of the machines for frictionally engaging the spindles 21 and the friction applied by these brakes to their respective spindles may be adjusted by micrometer operated screws or by other suitable means. Thus, by adjusting the friction exerted by the brakes 146, a common frictional resistance to operation of the electric motors may be established whereby the test readings will be substantially identical for all of the machines for material under test having substantially like characteristics.

Referring now to the diagrammatical view of Fig. 3 which shows the electrical circuits of the machine, the watt hour meter, designated in general by the numeral 13 may be of any suitable reversible induction motor 11 and similarly a side of the meter and the numeral 123 designating the voltage or potential side of the meter. Main lines which may be the usual 110 volt lines are designated by the numerals 124 and 125 and these main lead wires connect respectively to contacts 126 and 127 of a reversing switch 128. The watt hour meter 13 is connected in the main line 125 and a lead wire 130 connects one terminal of the potential side or armature of the meter to the other main lead wire 124. In the lead wire 130 is a manually operable switch 131 provided to cutout the potential 123 of the meter to stop operation of the meter, and also in the line 130 is the manually operable, normally closed switch 111 which is adapted when switch 131 is closed, to start the meter simultaneously with starting of the control mechanism 12. The reversible switch 128 includes the usual switch member designated 132 and two pair of contacts 133, 134. Lead wires 135, 136 connect the terminals 133 to the reversible induction motor 11 and similarly a pair of lead wires 137, 138 connect the other pair of contacts 134 to the motor 11. The control switch 82 is diagrammatically represented as comprising a pair of spaced contacts 139 and its movable switch member 83 biased toward closed position to normally bridge the contacts 139. Similarly the other switch 85 comprises in general a pair of spaced contacts 140 and its movable switch member 86 which is biased toward closed position to normally bridge the contacts 140. As previously mentioned, the switches 82 and 85 are controlled or actuated by the contact arms 78, 77 respectively which are mounted on the disc 75 which is rotated by the motor 11 through the speed reducing mechanism or gear train 70. Contacts 139 are connected in the lead wire 138 in series with the motor 11 by lead wires 142, 143 and contacts 140 of the other switch are connected in the lead wire 135 in series with the motor 11 by lead wires 144, 145. Control switch 85 is adapted to control operation of the motor rotating or driving in one direction or on cutting operation, and switch 82 is adapted to control operation of the motor 11 on reversing operation thereof or on return of the tool 10 to its starting position.

*Operation*

The herein described machine operates as follows: Assuming that the material 120 to be cut or tested is held securely in place below the tool 10, it is first desirable to make a circular starting cut in the material to a desired depth below the outer crust thereof or to a depth where a more accurate or average hardness reading of the material may be obtained. Assume further, that the tool 10 is in its starting position, that is, with its body 44 adjacent to or abutting the gear casing 28 as a stop so that the tool will rotate through its minimum circular path. In order that the tool 10 will travel a circular path on this first cut into the material, the clutch member 65 is disengaged from the driven gear 63, which disengagement renders inactive the lead screw 34 which is adapted otherwise for gradually increasing the radius arm of the tool as the tool rotates. Disengagement of the clutch is obtained by means of the manually operable lever 102 which when pulled to the left and downward, Fig. 4 pivots the lever 103 in a counterclockwise direction which raises the clutch member 65 out of engagement with the clutch teeth of the driven gear 63. Also upon pulling lever 102 downward and to the left, facing Fig. 4, cam 100 is rotated and engaging the casing wall 101 moves the casing to the left thereby disengaging the speed reduction gear train 70 from the drive gear 71, rendering the control mechanism ineffective for the first or circular cut. In addition, on pivoting the clutch operating lever 103, contact 109 carried by the free end of the lever 103 depresses the control member 110 of the normally closed switch 111 and opens this switch. Thus, it will be seen that by pivoting the lever 102 counterclockwise, Fig. 4, the clutch member 65 is moved to unclutch gear 63 from the driven shaft 31, gear train 70 is disengaged from driven gear 71 and switch 111 is opened. With the above mentioned drives in the positions stated and with control 77 holding switch 82 open, Fig. 3, the motor 11 is started when the reversing switch 128 is in the position shown, providing of course that line switch 124 is closed. This circuit to the motor 11 is as follows: From line 124, contact 126, switch 128, contact 133, lead wire 144, bridged contacts 140, lead wire 145, lead wire 135, motor 11, lead wire 136, reversing switch 132, contact 127 and back to the other main lead wire 125 through the field or amperage side 122 of the meter 13. Switches 111 and 131 are open cutting out the potential 133 of the meter 13 to prevent recording thereof since there is no point in recording the electrical energy employed during the initial cut into the material 120. With the tool rotating, it is lowered by the hand wheel to cut into the material a desired depth which is indicated on the dial plate 119. After this circular cut is made and with the tool still rotating or being driven by the motor 11, the handle or lever 102 is raised which results in clutch member being lowered, clutching gear 63 to the shaft 31, and meshing gear train 70 with drive gear 71 and permitting switch 111 to close. Lead screw 34 is now moved and moves the tool 10 outward, gradually increasing the radius of rotation of the tool about the axis of the spindle 21. As the tool rotates it follows a spiral path and cuts or shears or pushes material gradually from the wall of the cut. Simultaneously with the spiral cutting action of the tool, the disc 75 is started to rotate in a clockwise direction, through the speed reducing gear train 70. As the disc starts to rotate, contact 80 moves away from the switch control member 83 permitting the switch 82 to close and when the contact member 81 engages and moves the switch control member 86 of the switch 85, the switch 85 is opened breaking the circuit to the motor. During this operation, manual switch 131 is left open since this is only a preliminary cut and recording of the same by the meter 13 is not desired. The tool 10, rotating about and gradually moving out from the axis of the spindle 21 has now cut away a predetermined amount of material from the member 120, under control of the switch mechanism 12 and, leaving a flat substantially smooth surface at a predetermined depth below the outer surface of the material. By providing the initial cut to a suitable depth such that too much material is not removed and by selecting the proper speed ratio between the spindle and the lead screw such that the tool will move out gradually, the initial spiral cut leaves a smooth finished surface, so that the final cut will remove a known or predetermined amount of material. After completion of the cut the tool 10 is then returned to its starting position by operating the reversing switch 128 so that it engages contacts 134 which establishes a closed circuit to the motor 11 through the now closed control switch 82. On reversing the motor and tool, the disc 75 will rotate in a counterclockwise direction facing Fig. 5 and when control contact 80 engages the control member 83 of switch 82, the circuit to the motor is opened, stopping the tool 10. In the event of failure of the switch 82 to open the motor circuit on return of the tool 10 to its starting position, the tool carrying body 44 will strike the gear housing 28 and the gear 63 and clutch member 65 will slip by reason of the angularity of the cooperating clutch teeth thereby preventing injury to the machine.

With the tool 10 now returned to its starting position the final recorded cut is taken in the material 120. First the clutch member 65 by means of handle or lever 102 is again pulled down to unclutch gear 63 from shaft 31 so that to start the motor will only rotate the spindle 21 and the tool 10 will rotate through a circular path of travel. Of course, as previously mentioned when the clutch member 65 is raised, gear train 70 is disengaged from motor driven gear 71 and switch 111 is opened. Manual switch 131 is now closed but it will be seen that the meter 13 will not register since switch 111 is now open. The reversing switch is positioned to again engage contacts 133 and establish a circuit to the motor 11 through and controlled by the control switch 82. With the motor 11 rotating the tool, the tool is forced down into the material by means of the hand wheel 118 to a predetermined depth indicated by the dial 119. By releasing the lever 102, the clutch member 106 is instantly moved downward by the spring 66 into clutching engagement with the gear 63 and simultaneously spring 95 moves gear train 70 into driving relation with drive gear 71. Simultaneous with the above operations, switch 111 closes the circuit of the meter potential 123. It will thus be seen that at the instant the tool 10 starts its spiral cutting action, control 12 is brought into action and meter 13 begins to record the energy employed by the motor 11 to drive the tool. When the tool has completed its predetermined cut or travel, rotatable control contact 78 opens switch 85, stopping the motor. Since, the motor 11 will drive the tool 10 until the control arm travels from one contact to the other it will be seen that although control 12 is normally a time control, there will be no discrepancy in recording of the energy employed by the motor in the event of a voltage drop since this will only cause a slowing down of the motor with a corresponding slowing down of rotation of the control since the control is driven by the motor. Thus, the meter 13 will record the electrical energy required to drive the tool and will correspondingly indicate the characteristics of the material, such as its machinability, or will indicate the character of the bond of an abrasive or grinding wheel. After the recording is made the switch 131 may be opened and the motor 11 is then reversed by changing the reversing switch 128 to the other pair of contacts and the tool 10 is returned to its starting position for the next piece of material to be tested.

From the foregoing description it will now be seen that I have provided a new and improved machine for testing certain characteristics of material, such as the machinability of metal and the character of the bond of an abrasive or grinding wheel. By providing a machine, the material removing tool of which operates to remove a predetermined amount of material over a predetermined area, a substantially accurate recording of the characteristics of the material is obtained. Furthermore, by providing a machine of the above mentioned character having a conical shaped cutting tool arranged to roll on a circular cutting edge and shear or crumble material, that the tool will not quickly become dull. Also since the machine is adapted to operate until a predetermined amount of material is removed or cut away from material under test, it will be seen that even though the tool in time becomes dull, the accuracy of recording of the machine will not be materially affected. In addition, it will be appreciated that by determining the characteristics of material by recording the electrical energy required to remove a predetermined amount of material from the piece under test that an accurate recording may be made and that such recording will not be affected by change in the voltage since the machine automatically stops when and only when the said predetermined amount of material has been removed. Another advantage of the present machine is that the work or material may remain fixed or stationary so that a minimum of power is required to operate the tool as compared to such machines in which both the material and tool move against each other which provides for a more accurate reading and entails a saving in cost of operation. Furthermore, I have provided a new and improved machine for testing the characteristics of material by first removing material from a test piece down to a smooth surface and in so doing setting up strains and stresses in the material below said surface, then removing the stressed and strained material in the same manner that the first material is removed and recording the quantity of material removed the second time.

What I claim is:

1. In a machine for testing characteristics of material, a cutting tool operable to cut the material, electrically operated means to actuate said tool, means to register the total electrical energy required to actuate said tool in making a predetermined cut in the material, and control means actuated by said electrically operated means and operable to control the circuit of said registering means.

2. In a machine for testing characteristics of material, a cutting tool operable to cut the material, electrically operated means to actuate said cutting tool, electrically operated means to register the electrical energy employed to actuate said tool and cut away a predetermined amount of material, control means operable to control the circuit of said registering means and actuated by said electrically operated means, and means operatively connecting said control means and said electrically operated means.

3. In a machine for testing characteristics of material, a cutting tool operable to cut the material, electrically operated means to actuate said tool, means to register the total electrical energy required by said electrically operated means during the cutting operation, control means to limit the cutting operation, and clutch means operatively connecting said control means and said tool.

4. In a machine for testing characteristics of material, a cutting tool operable to cut the material, electrically operated means to actuate said tool, electrically operated means operable to register the electrical energy employed by said tool actuating means to cut the material, means controlling the circuit of said registering means to limit registering of electrical energy employed to a predetermined cutting operation of said tool, said controlling means being operable by said tool actuating means, and means to control operation of said controlling means by said tool actuating means.

5. In a machine for testing characteristics of material, a tool operable to cut the material, electrically operated means to actuate said tool, means to register the electrical energy employed by the tool operating means to indicate a corresponding hardness of the material under test, control means controlling said registering means and actuated by said tool actuating means, and means cooperating with said control means for controlling the electrically operated tool actuating means.

6. In a machine for testing characteristics of material, a tool operable to cut the material, means acting on said tool exerting a force to cut the material, means to indicate the application of said force exerting means, means controlling said indicating means, and means for stopping the tool after a predetermined operation thereof and controlling said first-named controlling means.

7. In a machine for testing characteristics of material, a tool operable to cut the material, an electric motor to drive said tool, means for indicating the electrical energy used by said motor, control means for said indicating means and driven by said electric motor, said control means being bodily movable to a position disconnected from said motor, and means to move said control means.

8. In a machine for testing characteristics of material, a tool operable to cut the material, an electric motor to drive said tool, means for indicating the electrical energy used by said motor, control means for said indicating means and driven by said electric motor, said control means being bodily movable from one position in which it is driven by said motor to another position disconnected from said motor, means to move said control means from one to the other of said positions, and switch means operable upon bodily movement of said control means and controlling said indicating means.

9. In a machine of the character described, a driven tool, an electric motor driving said tool, a movable control member operable to control the circuit of and actuated by said motor, speed reduction mechanism operatively connecting said motor and said control member, said control member being movable between predetermined limits by said motor, and means to indicate the total electrical energy employed by said motor to drive said tool during movement of said control member between said limits.

10. In a machine for testing characteristics of material, a spirally rotatable cutting tool operable to cut away some of the material, an electric motor to drive said tool, a watt-hour meter for registering the total amount of electrical energy required to drive said tool in removing a predetermined amount of the material, and switch means operable by said motor and automatically rendering said watt-hour meter inactive upon completion by said tool of the removal of said predetermined amount of material.

11. In a machine of the character described, a tool having an axis of rotation and also arranged to turn about another axis of rotation, means for increasing the radius arm of said tool as the tool rotates about said second-named axis, means operable to render said first-named means ineffective, an electric motor for turning said tool and for driving said first-named means, control means for controlling said motor and driven thereby, speed change mechanism operatively connecting said control means and said motor, said speed change mechanism being bodily movable to disengage said control means from said motor, an indicator for indicating the energy used by the motor and in circuit with said control means, and means for moving said speed change mechanism and also controlling said indicator and said first-named means.

12. In a machine for testing the bond of a grinding wheel, means for holding the wheel against movement, a spirally operable cutting tool for making a predetermined cut in the wheel, an electric motor for driving said tool, control means actuated by and controlling said motor and limiting operation of said tool to a predetermined number of turns, means operatively connecting said control means and said motor, and electrically operated means for registering the electrical energy required to operate said motor in turning said tool said predetermined number of turns and controlled by said control means.

DONALD R. STEWART.